Jan. 2, 1940.                    W. G. KNAPP                        2,185,507
                                FISHHOOK GUARD
                             Filed April 26, 1937
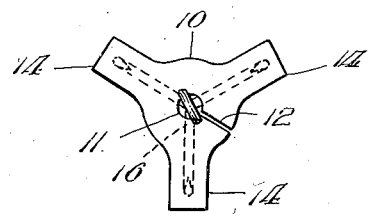
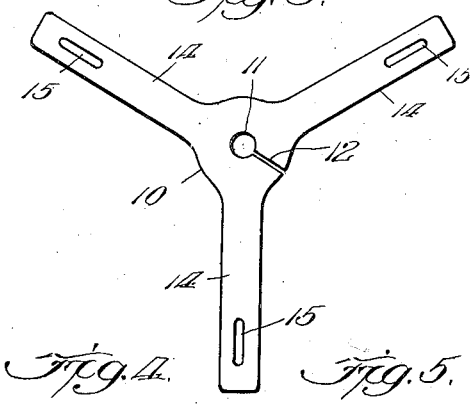
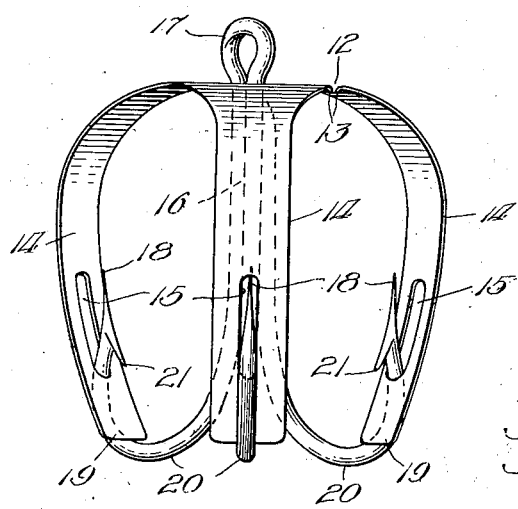
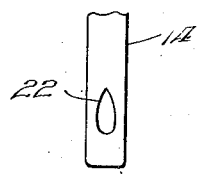
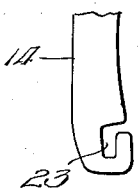
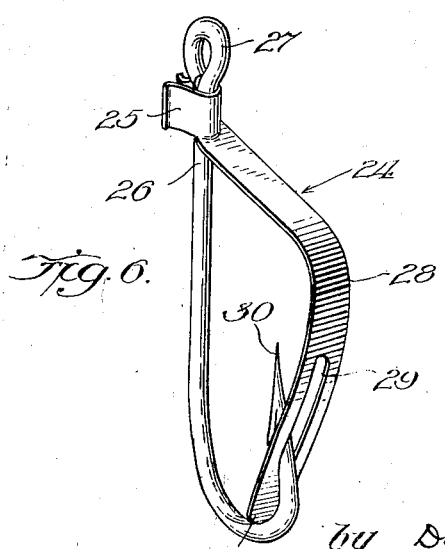
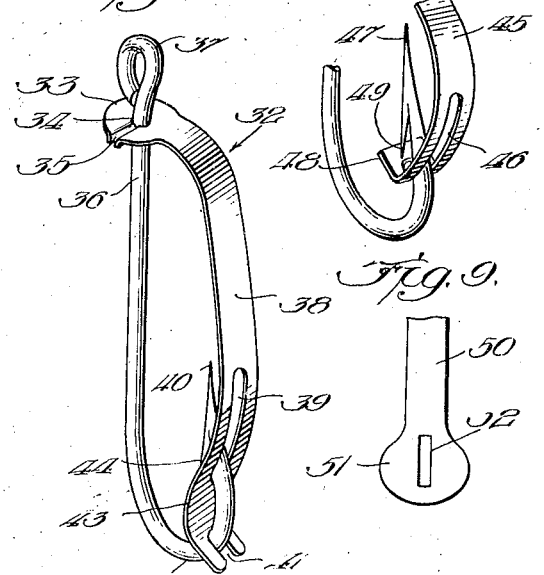
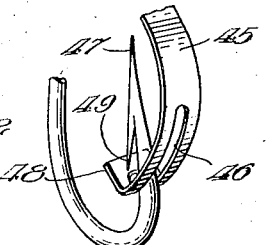
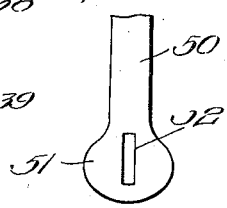
Inventor:
William G. Knapp.
by Davis, Lindsey, Smith & Shonts
                                    Attys.

Patented Jan. 2, 1940

2,185,507

UNITED STATES PATENT OFFICE 2,185,507

FISHHOOK GUARD

William G. Knapp, Evanston, Ill., assignor to Tri-Tix, Incorporated, Evanston, Ill., a corporation of Illinois Application April 26, 1937, Serial No. 138,909

11 Claims. (Cl. 43—38)

My invention relates to fishhook guards for definitely shielding the sharp points and barbs of fishhooks.

Because of their construction, fishhooks are peculiarly subject to becoming entangled with other hooks and tackle in a tackle box and, in the process of selecting any particular hook from the tangled mass, the user is frequently painfully injured by exposed hooks or barbs snagging the fingers. This condition obtains regardless of whether the hooks are loose or fastened to the usual plugs.

It is, therefore, the principal object of my invention to provide a guard for a fishhook which is carried by the hook and adequately protects the user against the sharp points of the hook.

A further object is to devise a guard of the character indicated which is capable of being formed in shapes that will accommodate either single or multiple hooks.

A further object is to provide a fishhook guard which can be simply and economically manufactured out of a variety of materials, and which can be quickly attached to and detached from a fishhook having any number of hooked portions.

These and further objects of my invention will be set forth in the following specification, reference being had to the accompanying drawing, and the novel means by which said objects are effectuated will be definitely pointed out in the claims.

In the drawing:

Figure 1 is a plan view of one form of my improved guard showing the same mounted on a multiple fishhook.

Fig. 2 is an enlarged, side elevation of the hook and guard illustrated in Fig. 1.

Fig. 3 is a plan view of the guard illustrated in Figs. 1 and 2, showing the same in a flattened position.

Figs. 4 and 5 are fragmentary elevations showing modified shapes of openings that may be provided in the arms of the guard to receive the pointed ends of the hooks.

Figs. 6 and 7 are perspective views showing two modifications of my improved fishhook guard that are particularly adapted for attachment to single fishhooks.

Fig. 8 is a fragmentary, perspective view showing a modified arrangement of the free end of the arm of the guard, this modification being capable of incorporation in a guard for single or multiple hooks.

Fig. 9 is a fragmentary elevation of a further modified shape of guard arm.

Referring more particularly to Fig. 3 of the drawing, there is illustrated a plan view of one form of my improved guard as the same appears after being initially manufactured. This guard may be made of any suitable material and preferably one which is characterized by a certain degree of springiness, such as spring metal, rubber, compositions of rubber and the like. This guard may be simply and economically manufactured by stamping or otherwise cutting the same out of the selected material and it will possess a thickness that will enable the same to be readily bent or bowed to engage the prongs of a fishhook.

In Fig. 3, the numeral 10 designates the central portion of the guard which is provided with an aperture 11 for surrounding the shank of a fishhook and extending radially from this aperture is a slit 12 whose defining edges may be curved or bent slightly, as indicated by the numeral 13 in Fig. 2, in order to facilitate the slipping of the shank of the hook through the slit 12 into the aperture 11. The guard under consideration is more particularly intended for application to a multiple hook, in this case, one provided with three hooks, so that, accordingly, the guard is provided with the corresponding number of radially extending and circumferentially spaced arms 14. The width of each of these arms may be varied as desired, but, in the usual case, the width will be sufficient to definitely shield the pointed end of the associated hook, as hereinafter described. Adjacent the extremity of each arm 14, there is provided an elongated aperture 15 through which the sharp portion of the hook is passed.

In Fig. 2, there is illustrated the application of the guard illustrated in Fig. 3 to a multiple fishhook having the usual shank 16 and eye 17. In mounting the guard under discussion to the multiple hook shown, the shank 16 is inserted through the slit 12 until the shank extends through the aperture 11. Preferably, the guard is moved upwardly until the central portion 10 thereof abuts against the lower portion of the eye 17 and, at this time, the arms 14 lie in a plane which is substantially normal to the axis of the hook shank.

Each of the arms 14 is then bowed downwardly and slightly inwardly toward the shank of the hook sufficiently to register the aperture 15 with the sharp point 18 of the adjacent hook. By this motion, it will be obvious that the point 18 is moved relative to the arm 14 from the outside to the inside thereof. Thereupon, each arm 14 may be further moved downwardly until the free end 19 thereof engages with some portion of the bight 20 of the associated hook.

When the guard is thus positioned, it will be obvious that each of the sharp ends of the hook, including the barbs 21 thereof, is located inwardly of the associated arm so that the latter definitely shields each of the indicated sharp points of the hook. The hook and guard may, therefore, be handled without any particular degree of caution and may be indiscriminately thrown into a tackle box with a minimum possibility of becoming entangled with other devices in the box. The guard is definitely maintained in position on the hook, notwithstanding that the same may be subjected to rough handling. This condition is due to the fact that the tendency of the springy arms 14 to resume their normal shape, i. e., to flatten out, holds the central portion 10 against the eye 17 of the hook and the free ends 19 of each arm against the bight 20.

In Figs. 4 and 5, there are illustrated modified shapes of openings that may be provided in the arms 14 to receive the sharp ends of the hooks. In Fig. 4, there is illustrated a teardrop aperture 22, while in Fig. 5, there is shown an L-shaped or bayonet slot 23.

Referring to Fig. 6, there is illustrated the adaptation of my hook guard to a single fishhook. In this figure, the numeral 24 designates the guard generally which is preferably formed of thin, springy material and which is originally cut as a T-shaped blank. The cross of this blank is thereafter bent and suitably curved to provide a spring clip 25 which is intended to frictionally grip the shank 26 of a fishhook and to normally be located adjacent the eye 27 thereof. This particular modification also includes a springy arm 28 whose shape is generally similar to that illustrated in Fig. 2 and which also includes an aperture in the form of an elongated slot 29 that is intended to receive the sharp end 30 of the hook. This sharp point 30 is located inwardly of the arm 28 and the free end of the arm 31 engages or bears against the bight of the hook in the manner already described.

The width of the slot 29 is only slightly greater than the diameter of the wire from which the hook is made so that, in conjunction with the abutting of the end 31 against the bight of the hook and the frictional grip of the clip 25 around the shank 26, the guard 24 will be definitely held in shielding relation to the sharp point and barb of the hook.

In Fig. 7, there is illustrated a further modification of the single hook type of guard which is represented generically by the numeral 32 and which is also initially formed as a simple stamping out of thin, springy or generally resilient material. One end of this guard is rounded and slightly enlarged to provide the end 33 and which includes an aperture 34. A slit 35 is cut in the portion 33 and this slit may be shaped similarly to that already described in connection with the guard illustrated in Figs. 2 and 3 and through this slit there is passed the shank 36 of the indicated fishhook until this shank extends through the aperture 34. The arm 38 is then bowed downwardly in the manner hereinbefore described to receive through the elongated slot 39 thereof the pointed end 40 of the hook. The lower or free extremity of the arm 38 is preferably bifurcated as at 41 to embrace the bight 42 of the hook and definitely position the guard against any shifting relative to the sharp points of the hook.

Between the free end of the arm 38 and the lower extremity of the slot 39, the arm is preferably bowed inwardly as indicated by the numeral 43, so that as the arm 38 tends to straighten, the end 33 is maintained in engagement with the eye 37 and the curved portion 43 in contact with the barb 44.

In Fig. 8, there is illustrated a still further modification, in which the springy or resilient arm 45 is provided with the usual slot 46 through which extends the pointed end 47 of the fishhook, but in this case, the free end of the arm 45 is bent upwardly, as indicated by the numeral 48 to engage the barb 49. This bent or flanged portion 48 will be maintained in contact with the barb 49 by the tendency of the arm 45 to straighten.

In Fig. 9, the guard arm 50 is enlarged at its free end, as indicated by the numeral 51, to facilitate its being grasped and positioned relative to the sharp point of a hook which projects through the slot 52.

It will be understood that any of the point-receiving apertures may be used in connection with any of the modifications shown and that, as far as the different shapes and arrangements of shielding arms are concerned, any of them may be employed with either the single or the multiple type of guard. The same condition holds true with reference to arranging that portion of the guard which encircles or frictionally grips the shank of the hook.

However formed, the spring arms of the guard definitely shield the sharp points of the hook, so that the same may be handled with despatch or carelessly thrown into a tackle box, with a considerable minimization of the danger and trouble which now characterize the handling and packing of fishhooks. Due to their shape and the thin material of which they are composed, my improved guards are capable of being quickly and cheaply manufactured, and they are also easy to handle and to apply and remove from hooks, whether of the single or multiple type.

I claim:

1. A fishhook guard for facilitating handling and preventing entanglement of the associated hook with other tackle in a receptacle comprising a part adapted for ready attachment to and detachment from the shank of a fishhook, and an arm extending therefrom having an opening for receiving the pointed end of the hook and adapted to be positioned to shield the point and barb of the hook.

2. A fishhook guard for facilitating handling and preventing entanglement of the associated hook with other tackle in a receptacle composed of springy material and comprising a part adapted for ready attachment to and detachment from the shank of a fishhook, and an arm extending therefrom having an opening for receiving the pointed end of the hook and adapted to be positioned to shield the same.

3. A fishhook guard composed of flat, springy material and comprising a slit portion adapted to encircle the shank of the hook, and an arm extending therefrom having an opening for receiving the pointed end of the hook and adapted to be positioned to shield the same.

4. An integral guard for a multiple fishhook comprising a part attachable to the shank of a hook, and a plurality of arms extending therefrom, each having an opening for receiving the pointed end of a hook and adapted to be positioned to shield the same.

5. The combination of a fishhook and a guard therefor comprising a part detachably mounted on the shank of the hook, and an arm extending therefrom having an opening adjacent the free end of the arm, the point of the hook projecting inwardly through the opening to be shielded by the arm and the free end of the arm engaging the bight of the hook.

6. The combination of a fishhook and a guard therefor formed of springy material and comprising a part detachably mounted on the shank of the hook, and a bowed arm extending therefrom having an opening adjacent the free end thereof, the point of the hook projecting inwardly through the opening to be shielded by the arm and the tendency of the arm to straighten maintaining the part and a portion of the arm in contact with the eye and barb of the hook, respectively.

7. A fishhook guard comprising a part attachable to the shank of a hook, and an arm extending therefrom having an opening adjacent the free end thereof for receiving the pointed end of a hook and the free extremity of the arm being bent inwardly to engage the barb.

8. The combination of a multiple fishhook and a guard therefor comprising a part detachably mounted on the shank of the hook, and a plurality of arms extending therefrom, each arm including an opening through which projects inwardly the point of the associated hook to be thereby shielded by the arm and the free extremity of the arm engaging the bight of the associated hook.

9. The combination of a multiple fishhook and a guard therefor composed of springy material and comprising a part detachably mounted on the shank of the hook and a plurality of arms extending therefrom, each arm being bowed and including an opening through which the point of the associated hook projects inwardly of the arm to be shielded thereby and the tendency of the arms to straighten maintaining the part and the ends of the arms in contact with the eye and barbs of the hooks, respectively.

10. A fishhook guard comprising a part attachable to the shank of a hook, and an arm extending therefrom having an opening through which the pointed end of the hook is adapted to extend in shielded relation to the arm, the free end of the arm being enlarged to facilitate its being positioned relative to the hook.

11. A fishhook guard for facilitating handling and preventing entanglement of the associated hook with other tackle in a receptacle comprising a substantially flat, thin strip of springy material, one end of the strip being arranged for detachable mounting on the shank of a fishhook adjacent the eye thereof and the opposite end being bowable to rest against the bight of the hook, the strip including an opening adjacent said opposite end through which the point of the hook is adapted to extend for shielding by the strip, and the tendency of the strip to straighten maintaining the ends thereof in contact with the eye and bight of the hook, respectively.

WILLIAM G. KNAPP.